United States Patent [19]

Karow

[11] Patent Number: 5,577,170
[45] Date of Patent: *Nov. 19, 1996

[54] GENERATION OF TYPEFACES ON HIGH RESOLUTION OUTPUT DEVICES

[75] Inventor: Peter Karow, Hamburg, Germany

[73] Assignee: Adobe Systems, Incorporated, Mountain View, Calif.

[*] Notice: The term of this patent shall not extend beyond the expiration date of Pat. No. 5,398,306.

[21] Appl. No.: 172,387

[22] Filed: Dec. 23, 1993

[51] Int. Cl.⁶ ................................................. G06F 15/00
[52] U.S. Cl. ........................ 395/110; 395/103; 395/167
[58] Field of Search ................................. 395/110, 150, 395/108, 111, 115, 125, 102, 103

[56] References Cited

U.S. PATENT DOCUMENTS

| | | | |
|---|---|---|---|
| 4,331,955 | 5/1982 | Hansen | 340/728 |
| 4,580,231 | 4/1986 | Tidd et al. | 364/521 |
| 4,675,830 | 6/1987 | Hawkins | 364/518 |
| 5,099,435 | 3/1992 | Collins et al. | 395/150 |
| 5,241,653 | 8/1993 | Collins et al. | 395/139 |
| 5,301,267 | 9/1994 | Hassett et al. | 395/150 |
| 5,398,306 | 3/1995 | Karow | 395/110 |

*Primary Examiner*—Raymond J. Bayerl
*Assistant Examiner*—Steven P. Sax
*Attorney, Agent, or Firm*—Nixon & Vanderhye

[57] ABSTRACT

A technique is specified for the output of fonts on high resolution output devices, such as photosetters in particular. A processor unit optically scales a digitally stored font, by selecting a single master font in a digitized contour coding, in which the contours for each letter are provided with delimiting discrete control points and additionally with instructions, such as those stipulated for the "Intelligent Font Scaling"; by re-scaling the master font with a factor to the desired point size, and by utilizing the instructions in order to steadily vary the stroke thickness of the linearly re-scaled letters in a primary pre-set factor dependency, wherein the stroke thickness is increased for factors smaller than one and is decreased for factors larger than one. The font can also be typographically expanded and condensed which means keeping the widths of the vertical stems during broadening or narrowing, respectively.

27 Claims, 11 Drawing Sheets

FIG. 1

GRID ADJUSTMENT ON     GRID ADJUSTMENT OFF

FIG. 2A  FIG. 2B

RANDOM STEM POSITION IN
DOUBLE FINE TARGET GRID

STEM POSITIONS ARE ROUNDED
EXACTLY ONTO THE TARGET GRID LINES

FIG. 2C  FIG. 2D

OBTUSE CORNERS CAN OCCUR

PEAK CORNERS BASED
ON SPECIAL POSITIONING

FIG. 2E  FIG. 2F

RANDOM CURVE EXTREMES CAN
LEAD TO UNDESIRED BULGES

CURVE EXTREMES ARE, LIKE STEMS,
ROUNDED ONTO THE TARGET GRID LINES

- VERTICAL STRAIGHT STEMS
- HORIZONTAL STRAIGHT STEMS
- VERTICAL CURVE STEMS
- HORIZONTAL CURVE STEMS

FIG. 5

| ICON | INSTRUCTION COMMENTARY |
|---|---|
| ▮ | STEM: OBSERVE THE WIDTH OF DOWNSTROKES WITH TWO STRAIGHT VERTICAL CONTOURS |
| ▬ | BAR: OBSERVE THE WIDTH OF HORIZONTAL STROKES WITH TWO STRAIGHT, HORIZONTAL CONTOURS |
| ( | BOW: OBSERVE THE WIDTH OF BOWS WITH TWO ROUND VERTICAL CONTOURS |
| ⌒ | ARCH: OBSERVE THE WIDTH OF BOW CONNECTIONS WITH TWO CURVED, HORIZONTAL CONTOURS |
| [ | CURVE STEM: OBSERVE THE WIDTH OF VERTICAL DOWNSTROKES EACH WITH A STRAIGHT AND A CURVED CONTOUR |
| ⊓ | CURVEBAR: OBSERVE THE WIDTH OF HORIZONTAL STROKES EACH WITH A STRAIGHT AND A CURVED CONTOUR |
| □ | COUNTER: OBSERVE THE WIDTH OF WHITE SPACE (COUNTERS) |
| ||| | WEIGHT: CANONICAL OBSERVANCE OF RELATED STROKE WIDTHS |
| / | SLANT: OBSERVE THE STROKE WIDTHS OF SLASHES (DIAGONALS) |
| ⌖ | EXTREME: PLACEMENT OF EXTREME LYING CURVE POINTS (CONTROL POINTS TO BE FOUND LOWEST, HIGHEST, FURTHEST, LEFT OR RIGHT) |
| ⊨ | SERIF: CONTROL OF CROSSBAR SERIFS OR RESPECTIVE COMPONENTS OF SERIS |
| ⊐ | BAR SERIF: CONTROL OF DOWNSTROKE SERIFS OR RESPECTIVE COMPONENTS OF SERIS |
| ⌀ | OVERHANG: USE OF THE BASELINE FOR CONTROL OF THE OVERHANG FOR ARCHES |
| ▯ | TENSION: STRAIGHTENING OF FLAT CURVES WITH SMALL POINT SIZES (OPTIMA SWITCH) |
| ○● | SPOT: ADJUSTMENT OF THE STROKE WIDTH FOR DEVICES WHICH WRITE IN WHITE OR BLACK |
| △ | DELTA: SPECIAL INSTRUCTIONS FROM APPLE TO OBSERVE A DROPOUT WIDTH FOR STROKES |
| ( ) | DROPOUT: OBSERVE A DROPOUT FOR STROKES |

FIG. 6

ALTERATION OF THE STROKE WIDTH OF ALL LETTERS AS A FUNCTION OF THE POINT SIZE

FIG. 7

LINEAR BROADENING OF ALL LETTERS AS A FUNCTION OF THE POINT SIZE

FIG. 8

LINEAR ENLARGEMENT OF THE SMALL LETTERS AS A FUNCTION OF THE POINT SIZE

FIG. 9

LINEAR ENLARGEMENT OF
THE LETTER SPACE AS A
FUNCTION OF THE POINT SIZE

FIG. 10

CONTOURING AS A FUNCTION
OF THE POINT SIZE

| | |
|---|---|
| 48p | Hamburgefons |
| 40p | Hamburgefons |
| 32p | Hamburgefons |
| 28p | Hamburgefons |
| 24p | Hamburgefons |
| 20p | Hamburgefons |
| 16p | Hamburgefons |
| 12p | Hamburgefons |
| 10p | Hamburgefons |
| 9p | Hamburgefons |
| 8p | Hamburgefons |
| 6p | Hamburgefons |

FIG. 13

This letters have no self-fulfilli
self-representation. Their most
differentation between individ
letters. Bearing in mind the im
society, consider how easily th
the 8. In telephone directories

FIG. 14A

This letters have no self-fulfillin
representation. Their most imp
between individual characters.
mind the importance of numbe
how easily the numerals 3, 6 a
directories - especially if pages — 16p

FIG. 14B

This letters have no self-fulfilling purpose
most important task is to provide clear d
only to the letters. Bearing in mind the i
consider how easily the numerals 3, 6 a
especially if pages are overinked - it can
individual numerals in the very small typ
for new types: clearly distinguishable an

FIG. 14C

This letters have no self-fulfilling purpos
most important task is to provide clear
not only to the letters. Bearing in mind
consider how easily the numerals 3, 6 a
especially if pages are overinked - it car
individual numerals in the very small ty
for new types: clearly distinguishable a — 12p

FIG. 14D

This letters have no self-fulfilling purpose, neither
to provide clear differentation between individua
importance of numbers in a modern industrial s
the 8. In telephone directories - especially if pag
between these individual numerals in the very s
types: clearly distinguishable and unmistakable f
medium for self-representation. Their most impor
characters. This applies not only to the letters. B
consider how easily the numerals 3, 6 and 9 can

FIG. 14E

This letters have no self-fulfilling purpose, neit
task is to provide clear differentation between
mind the importance of numbers in a modern
be mistaken for the 8. In telephone directories
to distinguish between these individual numer
important criteria for new types: clearly distin
purpose, neither are they a medium for self-re
differentation between individual characters. T
numbers in a modern industrial society, consi — 10p

FIG. 14F

This letters have no self-fulfilling purpose, neither are they a
between individual characters. This applies not only to the le
how easily the numerals 3, 6 and 9 can be mistaken for the
problem to distinguish between these individual numerals in
clearly distinguishable and unmistakable forms.This letters h
important task is to provide clear differentation between indi
numbers in a modern industrial society, consider how easily t
pages are overinked - it can rapidly become a problem to dis
to one of the important criteria for new types: clearly disting
a medium for self-representation. Their most important task i
letters. Bearing in mind the importance of numbers in a mod

FIG. 14G

This letters have no self-fulfilling purpose, neither are th
differentation between individual characters. This applie
industrial society, consider how easily the numerals 3, 6
overinked - it can rapidly become a problem to distingui
to one of the important criteria for new types: clearly dis
neither are they a medium for self-representation. Their
This applies not only to the letters. Bearing in mind the i
numerals 3, 6 and 9 can be mistaken for the 8. In teleph
to distinguish between these individual numerals in the
types: clearly distinguishable and unmistakable forms.Th
representation. Their most important task is to provide c — 8p

Vor genau 20 Jahren begann der Siegeszug der CRT-Technologie für den Lichtsatz in der Satzherstellung. Digiset ist weltweit zu einem Begriff geworden. Seitdem hat sich in unserer technischen Welt weit mehr gewandelt. Die Schaltungen der ersten Digisets wurden mit Transistoren, Dioden, Widerständen und Kondensatoren aufgebaut, man spricht von den diskreten Bauelementen. Wesentlich diskreter, also geheimnisvoller, wurden aber dann die integrierten Schaltungen. Danach wurden aufwendige Steuerungen durch Minicomputer ersetzt. Heute haben selbstverständlich Mikroprozessoren viele Funktionen übernommen.

Verfolgt man diese Entwicklung, so kann man feststellen, daß die modernen Maschinen immer flexibler, leistungsfähiger und häufig noch preiswerter geworden sind.

Parallel zu dieser Entwicklung erlebte die Texterfassung, Textverarbeitung und Textverwaltung ebenfalls gewaltige Veränderungen. Es hat noch lange gedauert, bis die Korrektur von Texten über die Satzrechner wirtschaftlich eingesetzt werden konnte, bis ganze Zeitungsseiten belichtet werden konnten.

FIG. 15

Vor genau 20 Jahren begann der Siegeszug der CRT-Technologie für den Lichtsatz in der Satzherstellung. Digiset ist weltweit zu einem Begriff geworden. Seitdem hat sich in unserer technischen Welt weit mehr gewandelt. Die Schaltungen der ersten Digisets wurden mit Transistoren, Dioden, Widerständen und Kondensatoren aufgebaut, man spricht von den diskreten Bauelementen. Wesentlich diskreter, also geheimnisvoller, wurden aber dann die integrierten Schaltungen. Danach wurden aufwendige Steuerungen durch Minicomputer ersetzt. Heute haben selbstverständlich Mikroprozessoren viele Funktionen übernommen.

Verfolgt man diese Entwicklung, so kann man feststellen, daß die modernen Maschinen immer flexibler, leistungsfähiger und häufig noch preiswerter geworden sind.

Parallel zu dieser Entwicklung erlebte die Texterfassung, Textverarbeitung und Textverwaltung ebenfalls gewaltige Veränderungen. Es hat noch lange gedauert, bis die Korrektur von Texten über die Satzrechner wirtschaftlich eingesetzt werden konnte, bis ganze Zeitungsseiten belichtet werden konnten.

FIG. 16

Vor genau 20 Jahren begann der Siegeszug der CRT-Technologie für den Lichtsatz in der Satzherstellung. Digiset ist weltweit zu einem Begriff geworden. Seitdem hat sich in unserer technischen Welt weit mehr gewandelt. Die Schaltungen der ersten Digisets wurden mit Transistoren, Dioden, Widerständen und Kondensatoren aufgebaut, man spricht von den diskreten Bauelementen. Wesentlich diskreter, also geheimnisvoller, wurden aber dann die integrierten Schaltungen. Danach wurden aufwendige Steuerungen durch Minicomputer ersetzt. Heute haben selbstverständlich Mikroprozessoren viele Funktionen übernommen.

Verfolgt man diese Entwicklung, so kann man feststellen, daß die modernen Maschinen immer flexibler, leistungsfähiger und häufig noch preiswerter geworden sind.

Parallel zu dieser Entwicklung erlebte die Texterfassung, Textverarbeitung und Textverwaltung ebenfalls gewaltige Veränderungen. Es hat noch lange gedauert, bis die Korrektur von Texten über die Satzrechner wirtschaftlich eingesetzt werden konnte, bis ganze Zeitungsseiten belichtet werden konnten.

Was machte die Gutenbergbibel zum »unerreichten Meisterwerk« der Buchdruckerkunst? Die Druckausführung auf einer Handpresse? Wohl kaum, denn sie ist nach unseren heutigen drucktechnischen Maßstäben in ihrer Farbgebung nicht von einer besonderen Qualität. Das Papier könnte mit handgeschöpftem Bütten auch in diesen Tagen beschafft werden. Sind es die Proportionen des Satzspiegels auf der Seite? Auch diese könnten wir nachmachen. Übrig bleibt also dann nur noch das Satzbild.

Wie erreichte aber Gutenberg jene gleichmäßige Graufläche der Spalte, ohne störende Löcher zwischen den Worten? Sein Geheimnis: Der Meister erzielte es durch mehrere verschieden breite Buchstaben und benutzte zahlreiche Ligaturen und Abbreviaturen innerhalb seines Typenmaterials. Am Ende benötigte er 290 Zeichen für den Satz der 42-zeiligen Bibel. Ein enormer Zeitaufwand, um seine Idee von typographischen Zeilen zu verwirklichen: Der gleichlangen Zeile gegenüber den unterschiedlich langen der mittelalterlichen Schreiber.

Was machte die Gutenbergbibel zum »unerreichten Meisterwerk« der Buchdruckerkunst? Die Druckausführung auf einer Handpresse? Wohl kaum, denn sie ist nach unseren heutigen drucktechnischen Maßstäben in ihrer Farbgebung nicht von einer besonderen Qualität. Das Papier könnte mit handgeschöpftem Bütten auch in diesen Tagen beschafft werden. Sind es die Proportionen des Satzspiegels auf der Seite? Auch diese könnten wir nachmachen. Übrig bleibt also dann nur noch das Satzbild.

Wie erreichte aber Gutenberg jene gleichmäßige Graufläche der Spalte, ohne störende Löcher zwischen den Worten? Sein Geheimnis: Der Meister erzielte es durch mehrere verschieden breite Buchstaben und benutzte zahlreiche Ligaturen und Abbreviaturen innerhalb seines Typenmaterials. Am Ende benötigte er 290 Zeichen für den Satz der 42-zeiligen Bibel. Ein enormer Zeitaufwand, um seine Idee von typographischen Zeilen zu verwirklichen: Der gleichlangen Zeile gegenüber den unterschiedlich langen der mittelalterlichen Schreiber.

FIG. 19

GENERATION OF TYPEFACES ON HIGH RESOLUTION OUTPUT DEVICES

RELATED APPLICATION

This application is related to my commonly assigned, copending U.S. application Ser. No. 08/141,962, filed Oct. 28, 1993 (corresponding to EP 92 250314.9 filed Oct. 29, 1992) (Atty. Docket 35-60).

BACKGROUND OF THE INVENTION

1. Field of the Invention

The invention concerns a technique to output fonts on high resolution output devices.

2. Prior Art

High resolution output devices include, for example, electronic phototypesetters or high resolution laser printers. These devices include a separate processor unit which receives the text as such to be output, for example from an external computer, and with the application of digitally stored fonts converts it into a pre-set font form of a particular font type and size. A margin adjustment can also be taken into consideration in this process. The data output by the separate processor unit contains complete information about the font image and is fed to an interim storage, which serves to activate an output unit which transfers the data, for example with the help of a laser beam, onto a duplicating medium such as a film or paper.

Font size is measured in a typographic unit, which is denoted with point (pt), and it is: 1 pt=0.351 mm (Europe: 0.375 mm). In the past all the different point sizes of a font were specially manufactured. The stamp punch of the letters was created by hand and served for the production of the matrixes. With this the letter image could be transferred by the typesetter into lines of poured lead. Later, in addition to this hot metal technique photocomposition appeared, which made the enlargement or reduction of letters in a linear fashion possible. With this development, one only needed to produce a font in one size as a master (normal size or design size) and could create various desired font sizes through linear scaling in the photocomposition machine. This method, to simply manufacture one master, spread generally throughout the graphic industry for cost reasons.

In the last few years the photocomposition technique has been superseded by computer-controlled phototypesetting techniques. The typefaces are stored digitally, and in this context outline coding has caught on extensively today, in which the contours or edges of a letter are described through discrete control points and connected curve elements as displayed in FIG. 1. For example the X-, Y-co-ordinates of the start, corner, curve and tangent points are digitized as points and the curve elements are described as a set of vectors, as arcs of circles, as Bezier-functions, as spirals or as Spline-functions by the various manufacturers. An overview of the digital font formats can be found in the book "Digital Typefaces", Peter Karow, Springer Verlag, Berlin Heidelberg, 1992 (hereby incorporated by reference). Even with digitally stored fonts, today a simple master is used for each font type, and this is re-scaled according to the desired size, both for low resolution printers as well as for high resolution phototypesetters. A low resolution runs, for example, to 100 lines per inch (lines per inch=lpi) in the case of screen devices and up to 300 lpi with dot-matrix or laser printers. The high resolution runs to around 2500 lpi with electronic phototypesetting systems. This means, for example, that fonts on screens in 9 pt text size have a stroke width of only one screen point (pixel), whereas on the other hand with high resolution the same stroke width is formed from 25 pixels.

Aside from the control points for definition of the outline, the letters receive so-called instructions which are used for the rasterization to output the letter, for example on a laser printer or a screen, and is used today by all manufacturers of digital fonts to "intelligently raster" (Intelligent Font Scaling) (compare, e.g., "Intelligent Font Scaling" by Peter Karow, URW brochure, or Peter Karow "Intelligent Font Scaling—The Technique of Sizing Fonts", Hamburger Satzspiegel, Hamburg 3/1990) (hereby incorporated by reference).

The linear re-scaling of digitally stored fonts as applied previously is, however, still unsatisfactory in various aspects. The font sizes manufactured from a master through linear enlargement/reduction are at the moment clearly inferior in their legibility and entire aesthetic impression to the optically correct and typographically appropriately manufactured font sizes. The typographically correct "Optical Scaling", as applied without further thought or rules for the separate production of font sizes during the days of hot-metal, takes into consideration that the resolving power of human eyes is limited. We need a larger interval between letters for small printed text (e.g. 5 pt) than for normal book text (e.g. 9 pt), in order that the letters do not seem to grow together and the small text remains readable. The same applies for small white inner counters such as in the lower case letter e. Very thin strokes (e.g. swash lines, so-called hair lines) must be strengthened with small font sizes, in order that they remain at all recognizable and don't "break through", i.e. partly disappear during the printing process. Conversely, if one proceeds to bigger inscriptions (advertising, placards, titles), the letters throughout can be placed relatively closely together, inner counters can remain small and hair lines thin. This allows, if one starts from a master in the design size of the font, a summary in approximately the following way:

The smaller the font size,
1) the wider the setting,
2) the broader the letters, and
3) the thicker the strokes.

The bigger the font size,
1) the narrower the setting,
2) the letters can be narrower and
3) especially the hair lines can be finer.

Until now there have only been a few attempts at optical scaling of digitally stored fonts. In the year 1990 Henry Schneiker from the firm Kingsley/ATF, Tucson, Ariz., held a lecture at the Rochester Institute of Technology on "Type Quality vs. Type Technology". He suggested digitizing fonts and then to apply the concept of "Optical Scaling", used by ATF for lead, interactively on the screen for the digital fonts as well. Thereby he starts from the perspective that—although computer aided—the creation is still, as in the past, handwork.

In March 1991 the firm Adobe Systems, California, announced a concept called "Multiple Master". In connection therewith an automatic technique for optical scaling is displayed and explained for the first time. Two master fonts are necessary, one in a very small point size, and the other in a very large point size. The point sizes lying in-between are calculated through mathematical interpolation.

Further, for a typographically correct setting the problem of expansion/condensation (widening/narrowing) plays a role. Up until the discovery of the photocomposition technique, this requirement for print type in machine typesetting could only be satisfied through the offer of expanded or respectively condensed fonts. These broader, or respectively narrower variations of a print type had to be produced through expensive hand work. Therefore for cost reasons they were not manufactured and made available for most fonts. With the modern photocomposition technique the problem of expansion/condensation was solved with help from cylindrical mirrors or respectively lenses. In the same way electronic phototypesetters, discovered somewhat later, handled this problem through simple linear widening and narrowing of the letters. Thereby the letters in their entirety, i.e. both the black letter strokes as well as the white inner counters in the letters and between the letters in the typeset word would be widened or respectively narrowed.

With the IKARUS-System the firm URW has pursued a technique since 1975, by which the letters can be typographically correctly expanded/condensed half automatically. With help from protection zones the IKARUS-System is informed which vertical areas of a letter to hold rigid and which are variable with respect to their width. This technique does not allow itself to be fully automated, there always remains a residue of screen work for the font designer. Since 1981 the firm URW has started to apply the technique of linear mathematical interpolation for the purpose of condensation/expansion.

In the same way, with the concept of "Multiple Masters" interpolation for the purpose of automatic expansion/condensation is employed by the firm Adobe Systems, California. Thereby two fonts as master are always necessary, a narrow (condensed) one and a wide (expanded) one. This has the grave disadvantage that, not only is double the work necessary to manufacture the font, but also double the storage space is needed for fonts in the phototypesetters.

Figure 18:
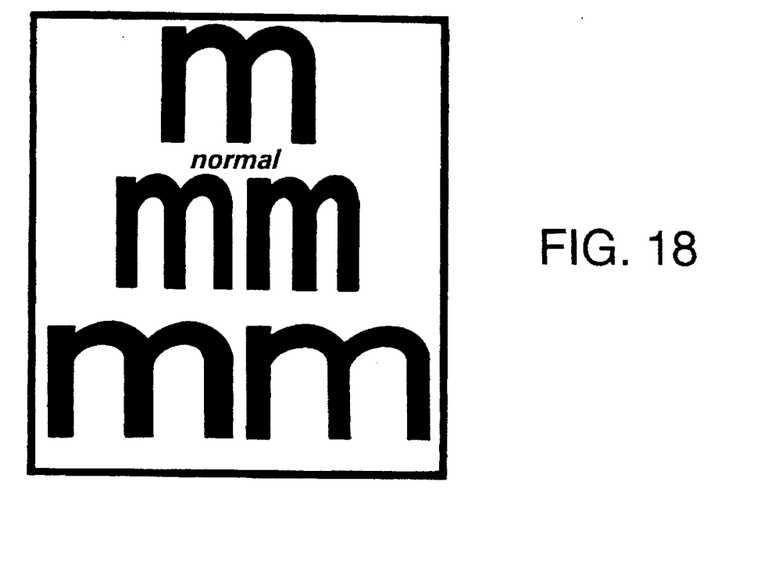
FIG. 18 depicts comparison of linearly expanded/condensed (left) and typographically correctly expanded/condensed letters (right)
Figure 19:
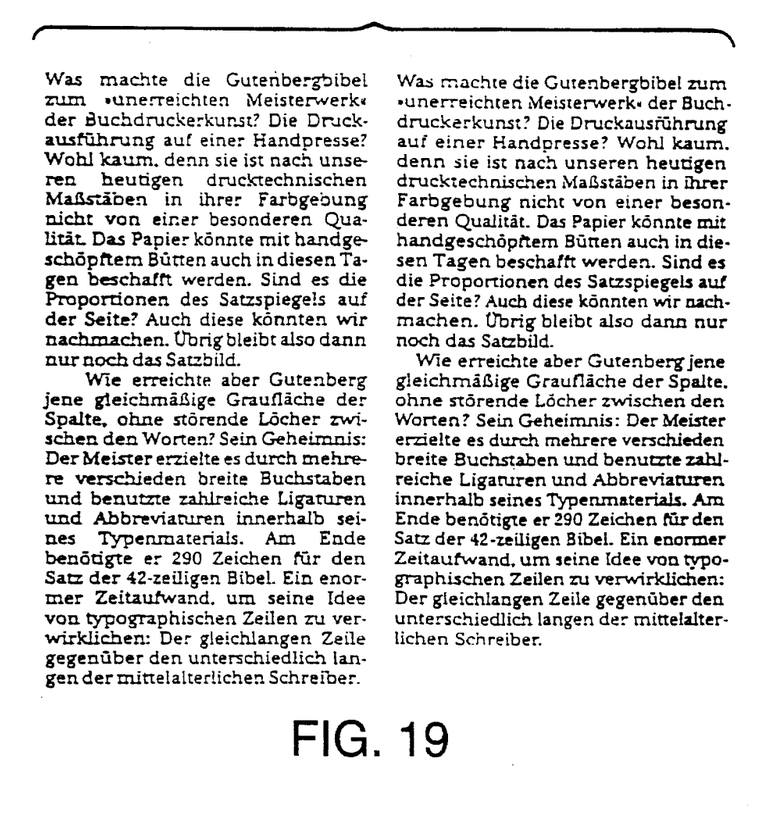
FIG. 19 depicts comparison of a sentence with traditional justification (left) and a sentence with typographically correctly expanded/condensed letters (right).

In newspapers and books text is normally made available "justified", which means all lines have the length of the column-width for columns. First of all the text is produced ragged, as shown in FIG. 15. Traditionally the interword space is then widened so that the lines, as in FIG. 16, are of the same length. This has the disadvantage that big gaps between words arise repeatedly, which impede the flow of reading. The technique of automatic linear expansion/condensation can likewise be applied, but leads to apparently emphasized (expanded=spaced out) or respectively insignificant (condensed=narrow printed) spots in the text, as is clear from FIG. 17, for which reason this technique is hardly used. One can overcome this disadvantage through correctly expanding or respectively condensing the letters typographically. Thereby, in keeping with FIG. 18, only the inner counters but not the stroke widths may be altered. If justifying is carried out with letter text expanded/condensed in such a way, effects of oversized gaps or unwanted accentuations no longer appear, as is recognizable from FIG. 19, instead a typographically desired solution for exacting column typesetting arises.

BRIEF SUMMARY OF THE INVENTION

This invention provides a technique for the output of fonts on high resolution output devices, such as high resolution printers and electronic phototypesetters, with which, starting from a single digitally stored master font, various font sizes can automatically be typographically correctly created, in order to achieve better legibility.

According to one aspect of the invention, a technique, which can be automated, is used through which, starting from a single master font subject to optical scaling, various font sizes can be created.

According to a further aspect of the invention, a technique, which can be automated, is used through which fonts can be typographically correctly expanded and condensed.

According to the invention, a technique is provided for the output of fonts on high resolution output devices, such as phototypesetters in particular, that feature a separate processor unit, an interim storage for the font data to be output and an output unit which transfers the data received from the interim storage directly onto a multiplication medium, wherein the separate processor unit is used to optically scale a digitally stored font before sending it further to the interim storage according to a technique in which these steps are carried out:

(a) supply a single master font in a digitized outline coding, in which the contours of each letter are provided with delimiting discrete control points and additionally with instructions, such as those stipulated for the "Intelligent Font Scaling", (b) linearly re-scale the master font with a factor to the desired point size, (c) apply the instructions according to the invention at issue in order to continuously vary the stroke width of the linearly re-scaled letters with the factor in a pre-set factor dependency, wherein the stroke width is increased for factors less than 1 and is decreased for factors larger than 1.

In a further aspect of the invention, a technique for the output of fonts on high resolution output devices, such as photosetters in particular, that feature a separate processor unit, an interim storage for the font data to be output, and an output unit which transfers the data received from the interim storage directly onto a multiplication medium, whereby the separate processor unit expands and condenses a digitally stored font before sending it further to the interim storage, according to a technique in which these steps are taken:

(a) supply a single master font in a digitized outline coding, in which the contours for each letter are provided with delimiting discrete control points and additionally with instructions, such as those stipulated for the "Intelligent Font Scaling", (b) linear expansion or condensation of the master font with a factor to the desired width, (c) apply the instructions according to the invention at issue in order to hold the stroke width constant during expansion or condensation of letters, to thereby only make the inner counters wider or narrower.

BRIEF DESCRIPTION OF THE DRAWINGS

An exemplary embodiment of the invention will be better understood with the help of the accompanying figures:

FIGS. 14a–14j depict text with linearly scaled letters in different point sizes (left) and with the point sizes scaled according to the invention technique at issue (right);

FIG. 15 depicts text in ragged;

FIG. 16 depicts text in traditional justification with adjustment of the interword space;

FIG. 17 depicts text with constant interword space, in which the adjustment is achieved through linear expansion/condensation of the letters of each word;

DETAILED DESCRIPTION OF THE EXEMPLARY EMBODIMENTS

Figure 1:
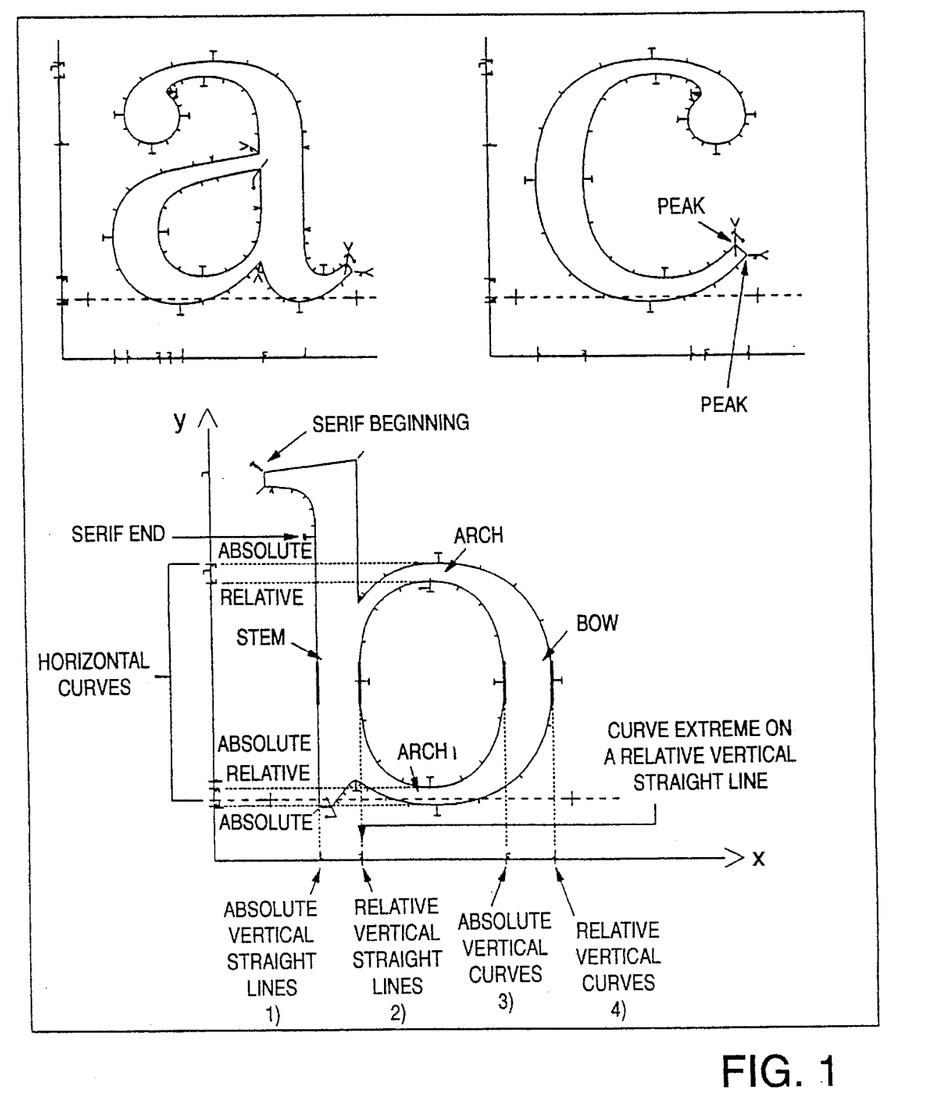
FIG. 1 depicts letters which have points displayed on their outlines for digital storage.
Figure 2A:
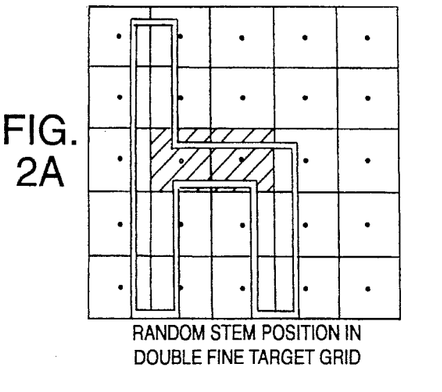
FIGS. 2a–2f depict rasterization of various form elements with and without adjustment to a grid.
Figure 2B:
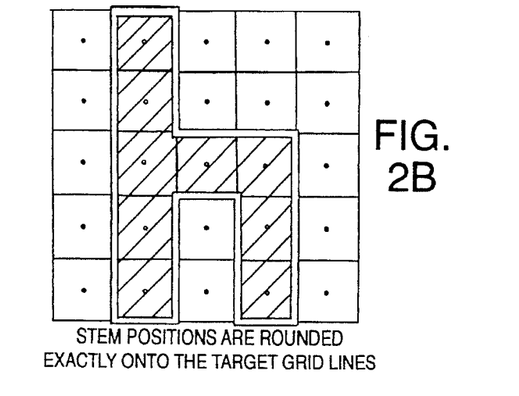
Figure 2C:
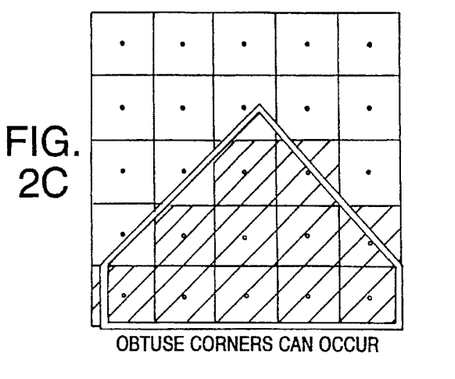
Figure 2D:
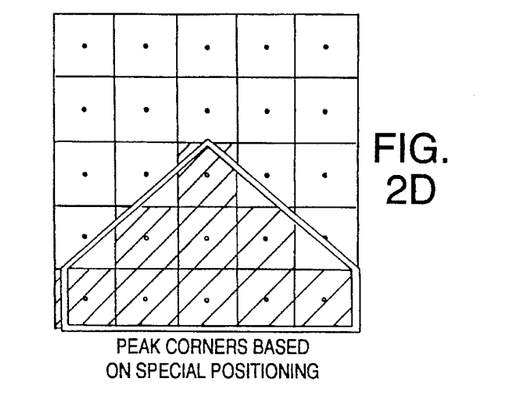
Figure 2E:
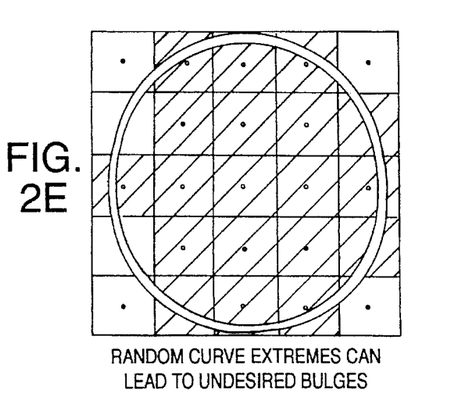
Figure 2F:
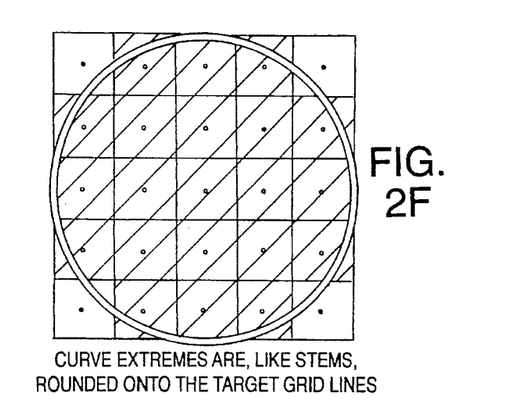

In FIG. 1 examples are displayed for the definition of the outlines of letters through discrete points; a comprehensive description of the current storage and process for letter definition is to be found in the book "Digitale Schoiften" by Peter Karow, Springer Verlag, Berlin-Heidelberg, 1992 which is hereby incorporated by reference.

Aside from points for the definition of the outline the letters receive so-called instructions, which are used with rasterization for output of the letters, for example on a laser printer or a screen. The meaning and application of the instructions can be illustrated with the example of a circle line as outer line. The rasterization occurs in that the circle is underlain with a uniform grid and all grid boxes which are more than 50 percent covered by the circle are blackened. A rough grid has few, a fine grid many raster points as a result. With laser printing the digitally controlled blacking of the paper is achieved in that raster points which lay horizontally next to each other are successively exposed (and thereby blackened), and raster points lying under each other are generated in successive laser lines displaced one point downward. The constant line interval corresponds to the height of the raster points, the constant pulse frequency between switching one point on and off in a line corresponds to the width of the raster point. This technique flows automatically, mostly in the raster image processors (RIP= Raster Image Processor) in the printing machines, which render outlines into rastered images.

With the help of FIGS. 2a–2f it is easy to see that even with the same raster grid and the same outline, different results arise if one displaces both lightly against each other.

Figure 3:
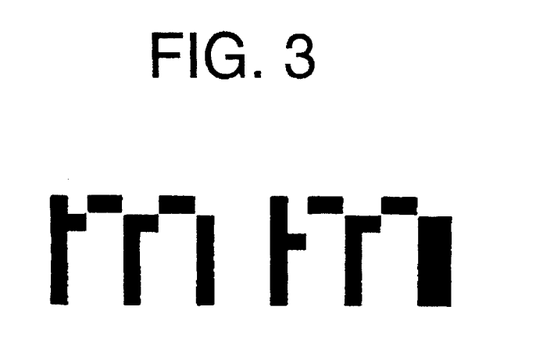
FIG. 3 depicts different rasterizations of two letters based on a small displacement of the grid.

With the rastering of letters such accidents should be avoided in order that the letters of a font are rastered as uniformly as possible. As things stand, constantly recurring elements appear in all fonts, such as the straight or curved stroke or stem. They can appear both vertically as well as horizontally and in this geometric impress are most strongly affected by accidental raster mistakes as FIG. 3 elucidates. Since only entire raster points exist, they can accidentally contain one raster point more or less. This can, for example with a display size of 10 pt (=2.5 mm cap height), mean a difference from 3:4 raster points, which corresponds to some 30%, hence a transition from a normal to a demi-bold font.

Figure 4:
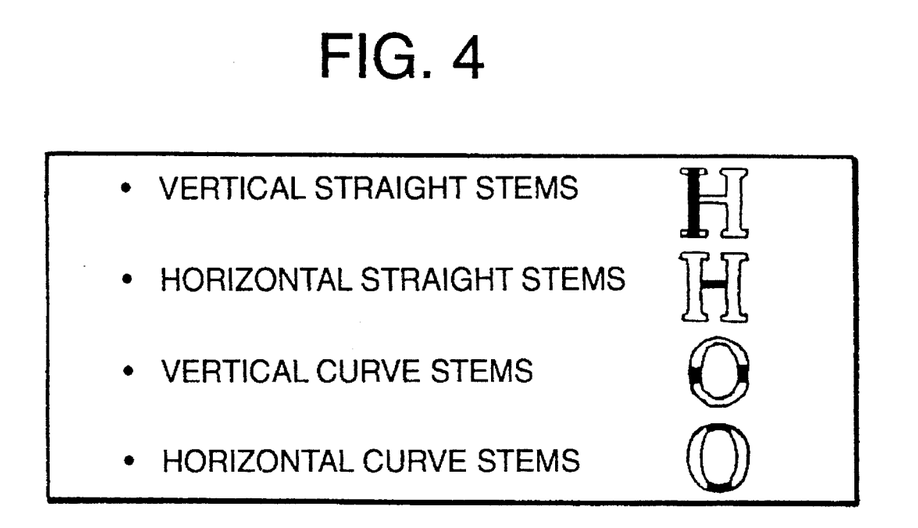
FIGS. 4 and 5 depict descriptive elements of a font, through which instructions can be defined.

To avoid raster mistakes of that sort, the manufacturers of digitally controlled laser printers have switched over to performing rasterizing of fonts more intelligently. To that end the letter data for each letter is additionally supplied with instructions. These have additional information for the rasterization, which permits an intelligent execution of the rasterization. Instructions are also marked as "hints" or "switches". They contain firstly an identification of the type of instruction, e.g. stem; an overview of the current instruction types is given in FIGS. 4 and 5. Additionally the instructions contain information about where the element, for example the stem, is to be found and how wide it is. Different instructions contain under the circumstances different information for the control of rasterization.

Figure 5:
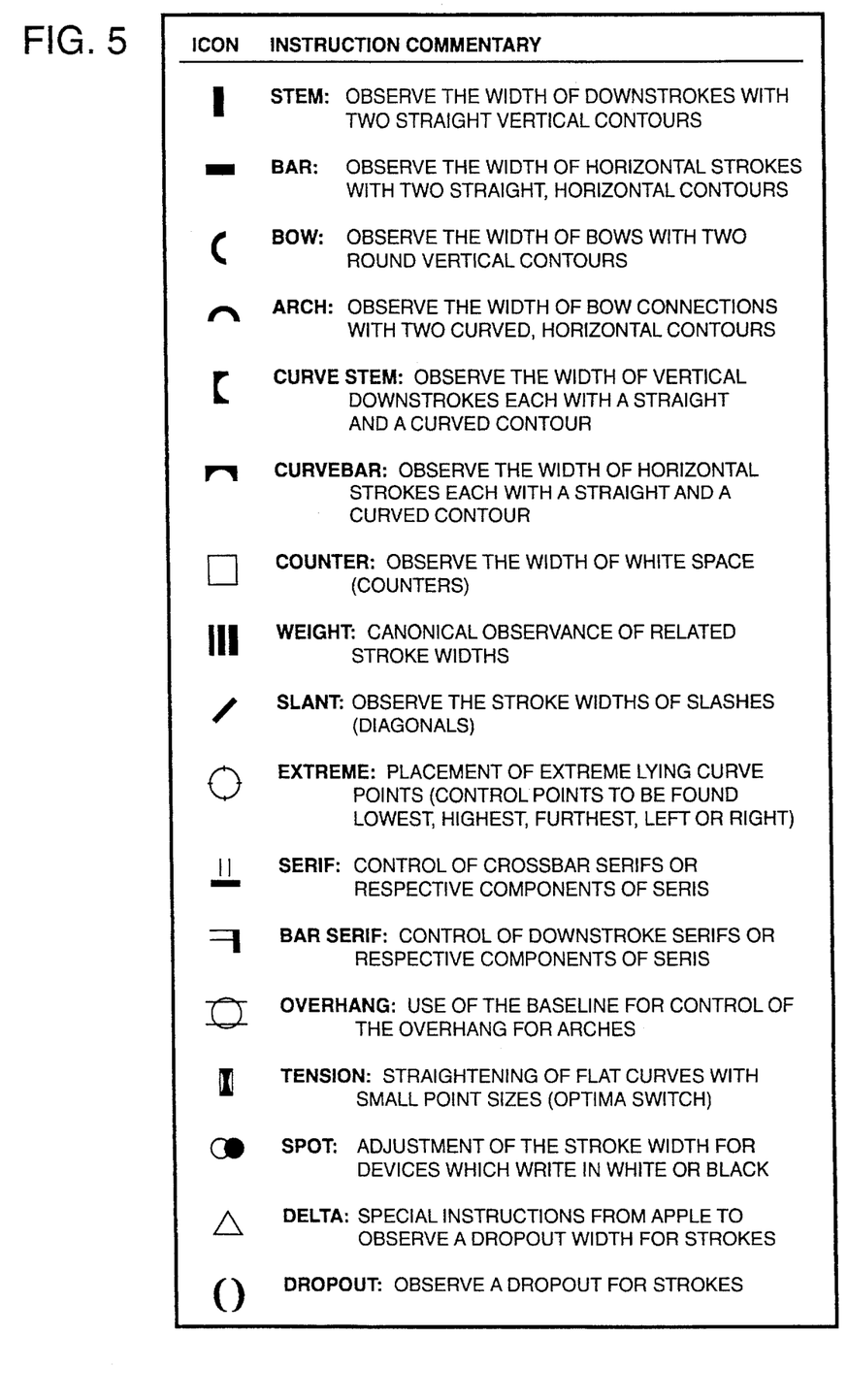

An instruction causes the important descriptive elements of a font, such as presented in FIG. 5, to be rasterized in a homogenous fashion. For a more precise illustration a stem, a straight vertical downstroke (as for example in I) can be examined. With help from the stem instructions the outline components which form the left and right limitations are automatically available. To avoid unfortunate accidents with rasterizing, the left edge of the I-stem is displaced onto the next grid line of the raster. This is effected through an X-displacement, which is applied to all coordinates of the outline. So no alteration in the form of the letter occurs yet. The right edge is then pushed onto the grid line which lies a particular number of grid points to the right of the left edge. This integer number is previously determined from the general instruction for the entire font. Thereby one starts from the average thickness of the descriptive elements, in the present case the average stem thickness, and, through rounding off, ascertains the best possible number of raster points for the display of the stem thickness. In this way it can come to a form alteration of the I to such a degree that, after the displacement of the right edge to a corresponding grid line, the I has a somewhat thinner or thicker stem width. For example in the case of a stroke thickness of 3.5 raster points, it would be rounded off to four raster points and the contour of the I stem would be correspondingly thickened by 0.5/3.5=14%. In any case, such a stem thickness would be achieved that automatically avoids accidental effects with the consequent rastering and that stands in harmony with the remaining font stem thicknesses. With this alteration in form, attention is paid to it being as small as possible, in the case of the I only the outline components lying to the right of the right stem edge are displaced in the X-direction. Thus the intent of the instructions and this technique is, to bring about that under compulsion one can either thicken or thin out stems, or other letter elements as well, or that these elements (such as the stem) can be pushed in a controlled fashion e.g. altogether to the left or right. This technique, which makes possible a uniform rasterization of the elements in the output devices, is also labelled "Intelligent Font Scaling". It is thus originally used for the avoidance of accidental rasterization on screens and laser printers at low resolutions.

According to the present invention henceforth the instructions will not be applied for the avoidance of raster mistakes at low resolutions (wherein there is selective thickening or thinning as are integral multiple of raster points or respectively on selective displacement of components of a letter). Instead with this invention, such instructions will be applied to randomly sensitized thickening/thinning for high resolution devices such as photosetters.

A thickening for example of the small letter b (see FIG. 1) occurs in such a manner that in the first two steps the two vertical stems (left stem, right bow) and then the two horizontal elements (upper and lower arch) are processed. Both steps proceed independently of one another. The first step consists of the following actions: with help from the four stem instructions (two absolute borders—(1) and (3)— and two relative borders (2) and (4)) all control points which lie to the left of border (1) are fixed. The thickening measure is added in the X-direction to the control points lying to the right of border (2) so they are shifted to the right. The thickening measure is added in a linearly interpolative fashion onto the control points with X-co-ordinates lying between borders (1) and (2), at (1) with zero, then linearly increasing until at (2) the full value is added. Thereby the left stem is thickened. The right bow is processed in the same way. The X-coordinates to the left of border (3) are fixed, between (3) and (4) the thickening measure is added in a linearly interpolative fashion, to the right of (4) fully added which is a shift to the right. The two arches in the Y-direction are analogously processed.

Thinning can be achieved entirely analogously through subtraction of a thinning measure.

Expansion of the letter b occurs at first through the simple application of an X-factor to all X-coordinates. Therewith, for the b the stem and the bow are also broader (thicker) by this factor. However, with the help of the former parameters for the stem borders (before the factor was applied) the original stroke thickness and therefore a thinning measure can be automatically determined.

Next, border (1) and everything lying to the left of it is fixed. Border (2) is displaced the amount of the thinning measure to the left, between (1) and (2) is displaced in a linearly interpolative fashion, and to the right of (2) is similarly displaced to the left in a linearly interpolative fashion so that close to (2) the thinning measure is fully added and in the middle between (2) and (3) it falls to zero. Similarly, with the help of the old borders (3) and (4) a thinning measure is determined for the bow and applied as above.

Condensation is similarly adjusted through the determination and processing of the thickening measure in the X-direction.

The instructions are applied according to the present invention for the steady thickening and thinning of stroke thicknesses of the letters with the output on high resolution output devices such as phototypesetters (resolution typically 2400 lpi). With application of the technique according to this invention, one starts from a single master font which is available in a middle point size of, for example, 12 pt, each letter is linearly re-scaled to the desired point size with a factor, and subsequently the instructions are applied in order to steadily alter the stroke thicknesses of the letter with a primary pre-set factor dependency.

Figure 6:
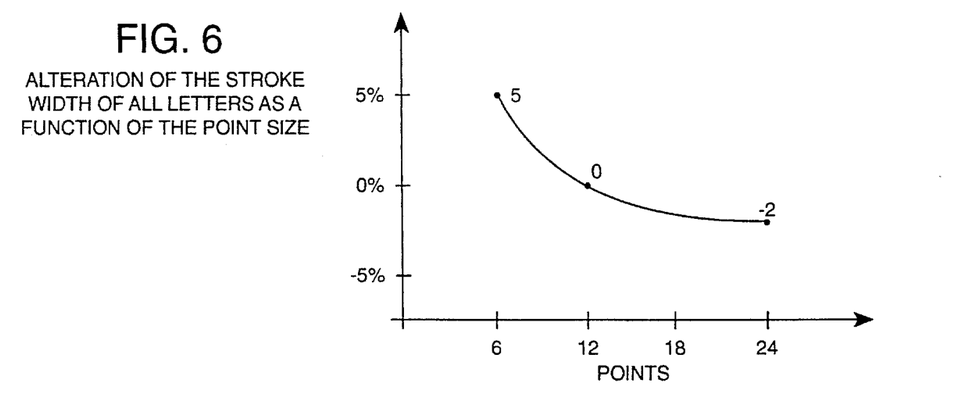
FIG. 6 depicts variation of the stroke width as a function of the point size with optical scaling according to the invention at issue.

The primary pre-set dependency is displayed in FIG. 6, which shows the percentage alteration of the stroke thickness as a function of the point size to which it is re-scaled. The stroke thickness is reinforced with the transition to small point sizes, in this application example the stroke thicknesses are increased by 5% upon the transition to the point size of 6, whereas by the transition to very big letters of a size 24 pt they are decreased by 2%.

Figure 7:
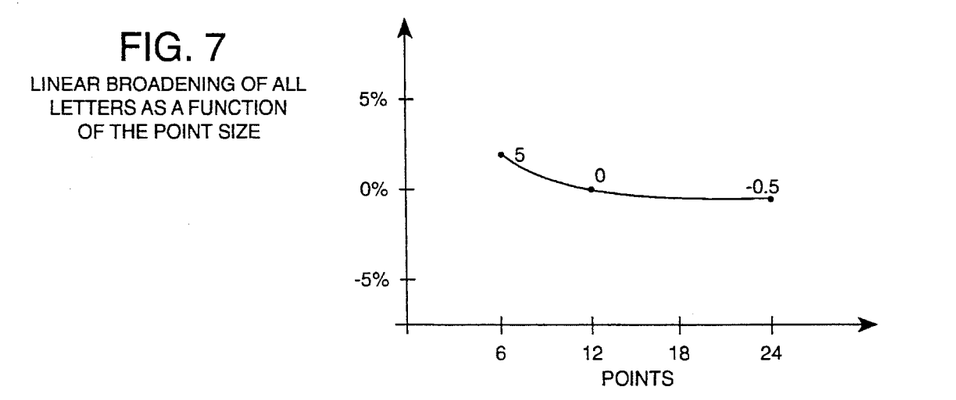
FIG. 7 depicts linear widening (narrowing) of the letters as a function of the point size.

In a favored embodiment of the invention, the width of the re-scaled letter is further varied in a second pre-set re-scaling factor dependency, whereby the width is increased upon transition to smaller point sizes and is decreased upon transition to bigger point sizes. An example is displayed in FIG. 7 for the second pre-set dependency, whereby the proportional linear broadening of all letters is shown as a function of point size. Upon transition to a small point size 6, the letters in their entirety are broadened by 2%, whereas upon the transition to very large letters of 24 pt they are narrowed by 0.5%.

Figure 8:
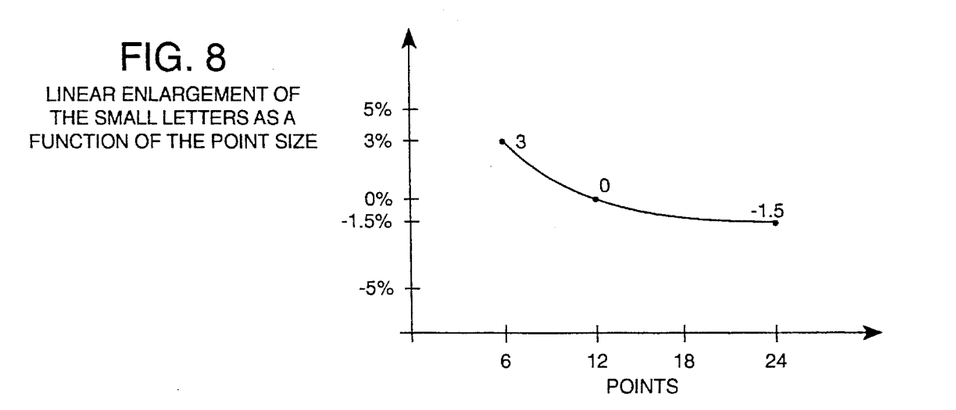
FIG. 8 depicts linear enlargement (reduction) of the height of lower case letters as a function of the point size.

Further, the height of the lower case letters is varied in a third pre-set factor dependency, whereby height is increased upon transition to small point sizes and is decreased upon the transition to large point sizes. FIG. 8 shows an example of the third pre-set dependency, mainly the proportional enlargement of lower case letters as a function of the point size to which they are re-scaled. Starting from a middle point size of 12 pt lower case letters are enlarged 3% by a linear re-scaling to point size 6, and upon re-scaling to very big 24 pt letters the height of lower case letters is decreased by 1.5%.

Figure 9:
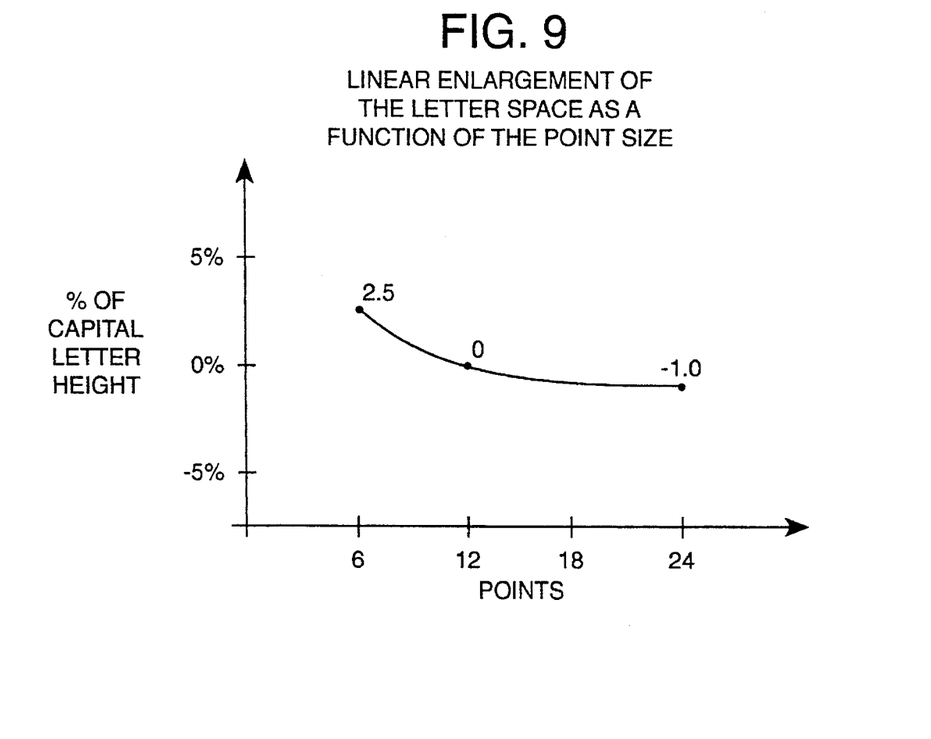
FIG. 9 depicts linear enlargement (reduction) of the space between letters as a function of the point size in percent of the capital letter height.

FIG. 9 shows a fourth pre-set dependency, which specifies the alteration of letter space in percent of capital letter height as a function of point size. Starting from a design font size of 12 pt, the letter space is enlarged by 2.5% of capital letter height upon re-scaling to a point size of 6 pt, and upon a transition to the point size of 24 pt it is decreased by 1% of capital letter height.

Figure 10:
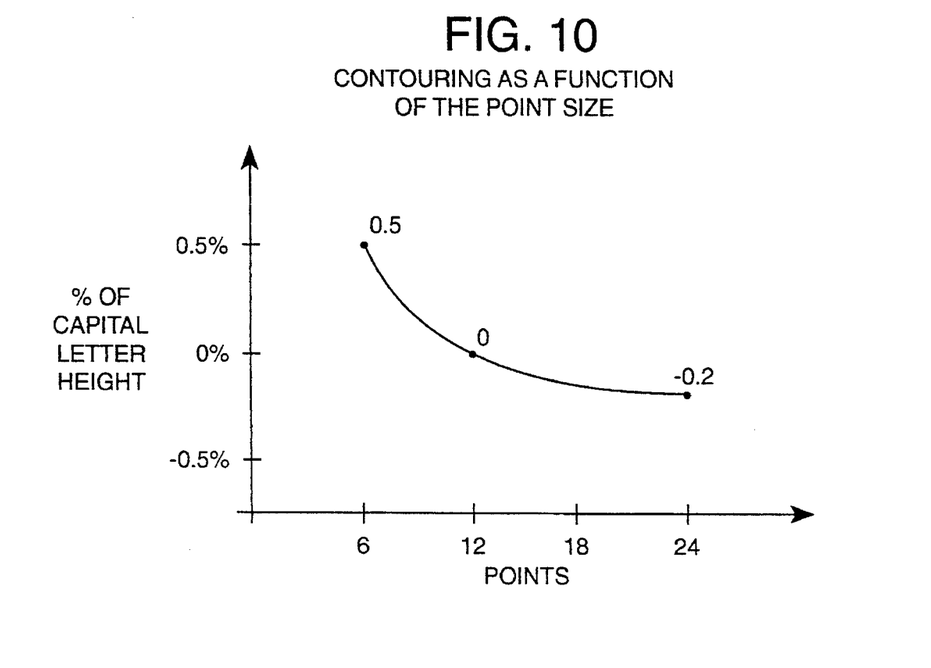
FIG. 10 depicts contour width as a function of the point size in percent of the capital letter height.
Figure 11:
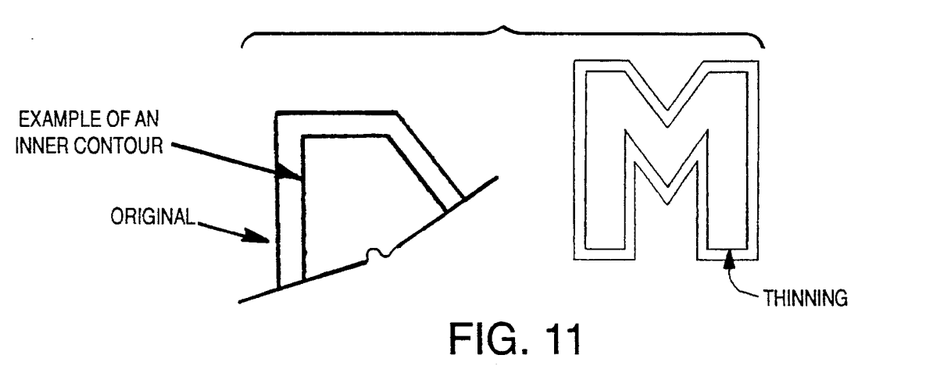
FIG. 11 depicts an example of an inner contour (thinning)
Figure 12:
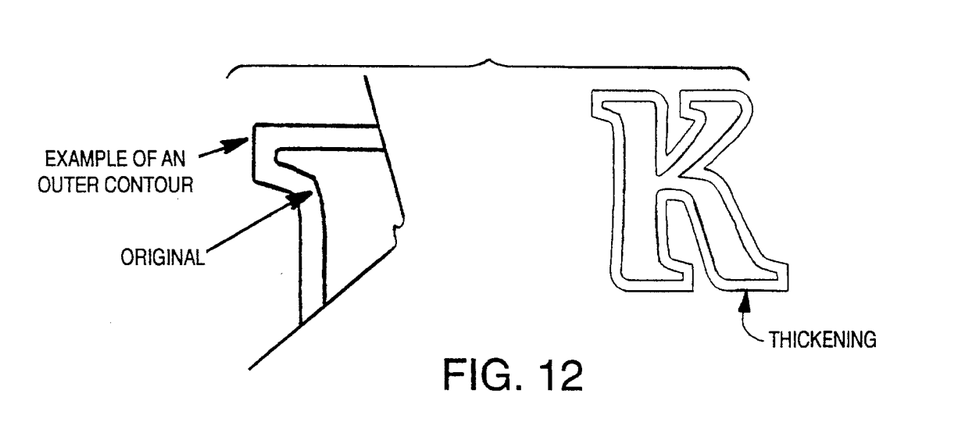
FIG. 12 depicts an example of an outer contour (thickening)

In a favored design form of the invention letters are provided with an outer contour after their re-scaling, which is laid on the outer contour of the re-scaled letter with a constant thickness as displayed in FIG. 12. The thickness of the contouring is determined by a fifth pre-set point size dependency. An example of the fifth pre-set point size dependency for the contour thickness is displayed in FIG. 10, whereby the thickness of the contouring is given as a percent of the capital letter height and positive values mean a thickening of the contour, as shown in FIG. 12, and negative values mean a thinning of the contour, as displayed in FIG. 11.

Figure 13:
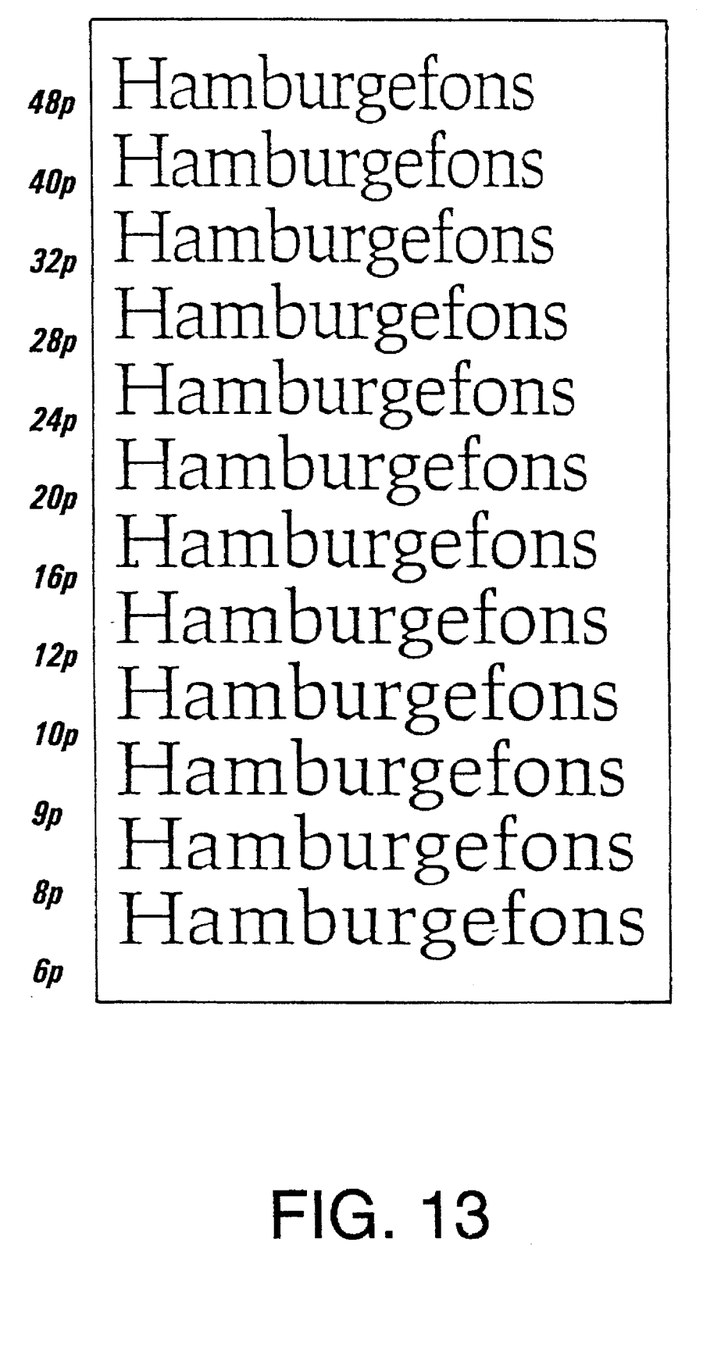
FIG. 13 depicts optically scaled letters in the same size, according to the invention at issue, after back-scaling the nominal point size.

FIG. 13 shows, with the technique according to the present invention, letters generated by optical scaling in various point sizes, after these were scaled back with the reciprocal of the linear re-scaling factors for comparison. The line in 28 pt is printed with normal size, the line in 48 pt is decreased with the factor 28:48=0.583, the line in 6 pt is enlarged with the factor 28:6=4.667. It is clearly recognizable that the small font in 6 pt is wider and broader and demonstrates larger stroke thicknesses. This optical scaling has the effect that small fonts also remain pleasing and well readable, as is recognizable with the help of FIGS. 14a–14j, where linear re-scaled text in various point sizes is contrasted to the left of the corresponding texts, which are automatically optically scaled in accordance with the present invention. Especially the small point sizes, such as around 6 pt, remain more readable. This is especially important if text is multiply copied or transmitted by telefax and its' quality is impaired. In these cases the optically scaled texts are substantially more readable and clearly surpass the traditional linearly re-scaled texts.

FIGS. 15 to 19 serve as illustrations of the expansion/ condensation, according to the invention at issue, under the application of the instructions. FIG. 15 shows a text column without margin adjustment and FIG. 16 shows a text column which is set with the traditional justification in that each of the interword spaces is appropriately enlarged for the margin adjustment. FIG. 17 shows the setting of a text column in which the interword space is constant and the justification of the line length is achieved through linear expansion/condensation of the letters. Thereby some text areas have an unwanted accentuated or out-spaced effect (1) or an unwanted trivializing effect (2). The mechanism of typographically correct as compared to linear condensation/ expansion is displayed in FIG. 18. On the left hand side the letter m is simply linearly narrowed or respectively broadened in the conventional manner (electronically), in contrast to a typographically correct expansion on the right side, where the stroke thickness is held constant with the help of the instructions and in this way only the inner counters of the letter are broadened or narrowed during the broadening/ narrowing. Since, in accordance with the present invention, the letters are expanded/condensed starting from a single master font, a superior typesetting technique can be achieved. One recognizes that, in contrast to the linear expansion/condensation shown in FIG. 17, no unwanted "emphasized" or "trivialized" places appear in the text.

While only a few examples of this invention have been described in detail, those skilled in the art will appreciate that many variations and modifications may be made in such examples while yet retaining one or more novel advantages of this invention. Accordingly, all such variations and modifications are intended to be included within the scope of the appended claims.

What is claimed is:

1. A method for generating the output of character fonts on high resolution output devices which include a separate processor unit, an interim storage for font data to be output and an output unit which transfers data received from interim storage directly onto a multiplication medium, wherein the separate processor unit optically scales a digitally stored font before sending it further to the interim storage, said method comprising the steps of:

selecting a single master font in a digitized outline coding, in which the contours for each letter are provided with delimiting discrete control points and additionally with font scaling instructions, and re-scaling the master font with a factor to the desired point size, and utilizing the instructions so as to steadily vary the stroke thickness of the letters linearly re-scaled with said factor in a primary pre-set factor dependency, wherein the stroke thickness is increased for factors less than one and is decreased for factors larger than one.

2. A method as in claim 1 wherein, starting from a master font in the size 12 pt, the stroke width is thickened by approximately around 5% upon re-scaling to a font size of 6 pt, and upon a re-scaling to a font size of 24 pt is thinned by approximately 2%.

3. A method as in claim 1 wherein, the width of linearly re-scaled letters is varied in a second pre-set factor dependency, wherein the width is increased for factors smaller than one and is decreased for factors larger than one, and the height of lower case letters is varied in a third pre-set factor dependency, whereby the height is increased for factors smaller than one and is decreased for factors larger than one.

4. A method as in claim 3 wherein, starting from a master font in 12 pt size, the width of letters is increased approximately 15% upon linear re-scaling to a font size of 6 pt, and is reduced approximately 1% upon re-scaling to a font size of 24 pt, and the letter height of small letters is increased up to 15% upon re-scaling to a font size of 6 pt, and is reduced up to 1% upon re-scaling to a font size of 24 pt.

5. A method as in claim 1 wherein letter spaces are broadened by a percentage of capital letter height with factors smaller than one, and are shortened by a percentage of the capital letter height with factors larger than one.

6. A method as in claim 5, wherein, starting from a size 12 pt master font, letter space is broadened by approximately 6% of capital letter height upon re-scaling to a font size of 6 pt, and is shortened by approximately 4% of capital letter height upon re-scaling to a 24 pt font size.

7. A method as in claim 1 wherein, the letters of linearly re-scaled fonts are provided with a uniform outer contour instead of the original by re-scaling with a factor smaller than one, whose thickness exists in a fourth pre-set capital letter height dependency, and uniform inner contour instead of the original is performed upon re-scaling with factors smaller than one, whose thickness exists in a fifth pre-set capital letter height dependency.

8. A method as in claim 7, wherein, starting from a master font in the size 12 pt, re-scaled letters are provided with a constantly thick outer contour of approximately 0.5% of capital letter height upon a transformation to a font size 6 pt in order to achieve a thickening of the character strokes and that a constantly thick inner contour with a thickness of approximately 0.2% of capital letter height is performed upon re-scaling to a font size 24 pt in order to achieve a thinning of the character strokes.

9. A method for generating the output of character fonts on high resolution output devices including a separate processor unit, an interim storage for font data to be output and an output unit which transfers data received from the interim storage directly onto a multiplication medium, wherein the separate processor unit expands and condenses a digitally stored font before sending it further to the interim storage, said method comprising the steps of:

selecting a single master font in a digitized contour coding, in which the contours for each letter are provided with delimiting discrete control points and additionally with font scaling instructions, and re-scaling the master font with a factor to the desired point size, and utilizing the instructions to hold letter stroke thickness constant during the expansion or condensation of letters and in this way only to broaden or narrow the inner counters.

10. A method as in claim 3 wherein, starting from a master font in 12 pt size, the width of letters is increased approximately 2% upon linear re-scaling to a font size of 6 pt, and is reduced approximately 0.5% upon re-scaling to a font size of 24 pt, and the letter height of small letters is increased up to 3% upon re-scaling to a font size of 6 pt, and is reduced up to 1% upon re-scaling to a font size of 24 pt.

11. A method as in claim 5 wherein, starting from a size 12 pt master font, letter space is broadened by approximately 2.5% of capital letter height upon re-scaling to a font size of 6 pt, and is shortened by approximately 1% of capital letter height upon re-scaling to a 24 pt font size.

12. A method for generating the output of character fonts for high resolution output devices including a processor for re-scaling a master font digitally stored in a digitized contour coding with discrete control points and scaling instructions comprising, re-scaling characters of the master font to a desired point size and, applying instructions to monotonically vary the character stroke width of the re-scaled characters with a pre-set factor dependency that is a function of the desired point size wherein a character stroke width is increased for factors smaller than one and is decreased for factors greater than one.

13. A method as in claim 12 wherein, starting from a master font of the size of 12 pt, varying the character stroke width by increasing the character stroke width by approximately 5% upon re-scaling to a font size of 6 pt, and decreasing the character stroke width by approximately 2% upon re-scaling to a font size of approximately 24 pt.

14. A method as in claim 12 including, increasing the width of a re-scaled character for factors smaller than one and decreasing the width of a re-scaled character for factors greater than one and, increasing the height of a small case re-scaled character for factors smaller than one and reducing the height of a small case re-scaled character for factors greater than one.

15. A method as in claim 14 wherein, starting from a master font of 12 pt size, upon re-scaling to a font of 6 pt size, increasing the width of a re-scaled character by approximately 2% and the character height of a small case character by approximately 3%, and upon re-scaling to a font of 24 pt size, decreasing the width of a re-scaled character by approximately 0.5% and the character height of a small case character by approximately 1.5%.

16. A method as in claim 14 wherein, starting from a master font of 12 pt size, upon re-scaling to a font of 6 pt size, increasing the width of the re-scaled character by approximately 15% and the character height of a small case character by approximately 15%, and upon re-scaling to a font of 24 pt size, decreasing the width of a re-scaled character by approximately 1% and the character height of a small case character by approximately 1%.

17. A method as in claim 12 wherein, starting from a master font of 12 pt size, upon re-scaling to a font of 6 pt size, providing the re-scaled characters with a uniformly thick outer contour with a width of approximately 0.5% of the large case character height, and upon re-scaling to a font of 24 pt size, providing re-scaled characters with a uniformly thick inner contour with a width of approximately 0.2% of the large case character height.

18. A method as in claim 12 wherein, a character of a linearly re-scaled font is provided with a uniform outer contour instead of the original contour upon re-scaling to a smaller point size with the thickness dependent on a pre-set capital character height, and a uniform inner contour instead of the original contour upon re-scaling to a larger point size with the thickness being dependent on a different pre-set capital character height.

19. A method for generating the output of character fonts on high resolution output devices which include a separate processor unit, an interim storage for font data to be output and an output unit which transfers data received from interim storage directly onto a multiplication medium, wherein the separate processor unit optically scales a digitally stored font before sending it further to the interim storage, said method comprising the steps of:

selecting a master font in a digitized outline coding, in which the contours for each character are provided with delimiting discrete control points and font scaling instructions, re-scaling a character of the master font with a factor to a desired point size, and using the instructions to monotonically vary the stroke thickness of the character linearly re-scaled with said factor in a pre-set dependency, wherein the stroke thickness is increased for factors less than one and is decreased for factors greater than one.

20. A method as in claim 19 wherein, starting from a master font in the 12 point size, the stroke width is thickened by approximately 5% upon re-scaling to a font size of 6 pt, and upon re-scaling to a font size of 24 pt is thinned by approximately 2%.

21. A method as in claim 19 wherein, starting with a master font of a pre-set intermediate point size, the stroke width upon re-scaling to a smaller font size is thickened to a width determined by interpolation between the stroke width for the master font and the stroke width for a font size of 6 pt, and the stroke width upon re-scaling to a larger font size is thinned to a width determined by interpolation between the stoke width for the master font and the stroke width for a font size of 24 pt.

22. A method as in claim 19 wherein, the width of a linearly re-scaled character is increased upon re-scaling to a smaller point size font and is decreased upon re-scaling to a larger point size font, and the height of a lower case character is increased upon re-scaling to a smaller point size font and is decreased upon re-scaling to a larger point size font.

23. A method as in claim 19 wherein, starting from a master font in 12 pt size, the width of a character is increased approximately 15% upon linear re-scaling to a font size of 6 pt, and is reduced approximately 1% upon re-scaling to a font size of 24 pt, and the character height of a lower case character is increased up to 15% upon re-scaling to a font size of 6 pt, and is reduced up to 1% upon re-scaling to a font size of 24 pt.

24. A method as in claim 19 wherein, starting from a master font in 12 pt size, the width of a character is increased approximately 2% and the character height for a lower case character is increased approximately 3% upon re-scaling to a font size of 6 pt, and the width of a character is decreased approximately 0.5% and the character height for a lower case character reduced approximately 1.5% upon re-scaling to a font size of 24 pt.

25. A method as in claim 19 wherein, starting with a master font of a pre-set intermediate point size, upon re-scaling to a smaller font point size increasing the width of a character to a width determined by interpolating between the width of the master font size character and a pre-set wider width for the character of font size of 6 pt and increasing the height of a lower case character to a height determined by interpolating between the height of the master font size character and a pre-set greater height for the character of font size of 6 pt, and upon re-scaling to a larger font point size, decreasing the width of a character to a width determined by interpolating between the width of the master font size character and a pre-set thinner width for the character of font size 24 pt and decreasing the height of a lower case character to a height determined by interpolating between the height of the master font size character and pre-set height for the character of font size pt 24.

26. A method as in claim 19 wherein, starting from a master font in the size 12 pt, re-scaled characters are provided with a constantly thick outer contour of approximately 0.5% capital character height for transformation to a font size pt 6 in order to achieve a thickening of the character stroke and, a constantly thick inner contour with a thickness of approximately 0.2% upon re-scaling to a font size 24 pt in order to achieve a thinning of the character stroke.

27. A method for generating the output of character fonts on high resolution output devices including a separate processor unit, an interim storage for font data to be output and an output unit which transfers data received from the interim storage directly onto a multiplication medium, wherein the separate processor unit expands and condenses a digitally stored font before sending it further to the interim storage, said method comprising the steps of:

selecting a single master font in a digitized contour coding, in which the contours for each letter are provided with delimiting discrete control points and additionally with font scaling instructions, and re-scaling a character of the master font with a factor to the desired point size, and utilizing the instructions to hold character stroke thickness constant during the expansion or condensation of the character and in this way only to broaden or narrow the inner counters.

\* \* \* \* \*